(12) United States Patent
Belz et al.

(10) Patent No.: US 8,949,914 B2
(45) Date of Patent: Feb. 3, 2015

(54) SYSTEM AND METHOD OF DELIVERING VIDEO CONTENT

(75) Inventors: Steven Belz, Cedar Park, TX (US); Marc A. Sullivan, Austin, TX (US); James Pratt, Round Rock, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 735 days.

(21) Appl. No.: 11/959,141

(22) Filed: Dec. 18, 2007

(65) Prior Publication Data

US 2009/0158373 A1 Jun. 18, 2009

(51) Int. Cl.
| | |
|---|---|
| H04N 7/173 | (2011.01) |
| H04N 21/231 | (2011.01) |
| H04N 21/4147 | (2011.01) |
| H04N 21/438 | (2011.01) |
| H04N 21/6587 | (2011.01) |

(52) U.S. Cl.
CPC ..... *H04N 7/17318* (2013.01); *H04N 21/23106* (2013.01); *H04N 21/4147* (2013.01); *H04N 21/4383* (2013.01); *H04N 21/6587* (2013.01)
USPC .............. 725/94; 725/93; 725/95; 725/96; 725/97; 725/103

(58) Field of Classification Search
USPC .................................. 725/86–104
See application file for complete search history.

(56) References Cited

U.S. PATENT DOCUMENTS

| | | | | |
|---|---|---|---|---|
| 6,523,176 | B1 * | 2/2003 | Yamane et al. ................. | 725/58 |
| 6,732,371 | B1 * | 5/2004 | Lee et al. ........................ | 725/41 |
| 2001/0038744 | A1 * | 11/2001 | Yamada et al. ................. | 386/94 |
| 2002/0168178 | A1 * | 11/2002 | Rodriguez et al. .............. | 386/92 |
| 2002/0184629 | A1 * | 12/2002 | Sie et al. ......................... | 725/41 |
| 2002/0199185 | A1 * | 12/2002 | Kaminski et al. ............... | 725/25 |
| 2003/0226150 | A1 * | 12/2003 | Berberet et al. ................ | 725/94 |
| 2005/0058437 | A1 * | 3/2005 | Meier et al. .................... | 386/112 |
| 2005/0262534 | A1 * | 11/2005 | Bontempi et al. .............. | 725/58 |
| 2006/0075446 | A1 * | 4/2006 | Klemets et al. ................ | 725/100 |
| 2006/0117357 | A1 * | 6/2006 | Surline .......................... | 725/90 |
| 2006/0150225 | A1 * | 7/2006 | Hegg et al. ..................... | 725/89 |
| 2007/0009235 | A1 | 1/2007 | Walters et al. | |
| 2007/0107026 | A1 * | 5/2007 | Sherer et al. ................... | 725/97 |
| 2007/0130597 | A1 | 6/2007 | Parker et al. | |

(Continued)

OTHER PUBLICATIONS

"DVR: Recording," Time Warner Cable Answers on Demand, www.timewarnercable.com/corporate/answersondemand/dver/recordingshows.html 2007.

*Primary Examiner* — Mushfikh Alam
(74) *Attorney, Agent, or Firm* — Guntin & Gust, PLC; Joseph P. Hrutka

(57) ABSTRACT

A method of delivering video content is disclosed and includes sending data from a set-top box device to a video head-end of a video distribution network. The data indicates that the set-top box device has received a channel change command and identifies a requested channel. The method includes receiving video content associated with a program provided via the requested channel at the set-top box device, beginning at a set-top box receipt time, and retrieving a portion of backfill content from a digital video recorder (DVR) in response to a reverse command received at the set-top box device. The backfill content includes video content associated with the program extending from a start time of the program to the set-top box receipt time. The backfill content is sent from a buffer server at the video head-end to the DVR in response to the data sent by the set-top box device.

21 Claims, 9 Drawing Sheets

(56) References Cited

U.S. PATENT DOCUMENTS

| | | | |
|---|---|---|---|
| 2007/0209054 A1* | 9/2007 | Cassanova | 725/100 |
| 2008/0109840 A1* | 5/2008 | Walter et al. | 725/25 |
| 2009/0165062 A1* | 6/2009 | Harris et al. | 725/87 |
| 2010/0215341 A1* | 8/2010 | Ellis et al. | 386/83 |
| 2011/0173658 A1* | 7/2011 | Allen et al. | 725/39 |

* cited by examiner

SYSTEM AND METHOD OF DELIVERING VIDEO CONTENT

FIELD OF THE DISCLOSURE

The present disclosure generally relates to communications networks, and more particularly relates to delivering video content.

BACKGROUND

An individual may tune to a television program after it starts and desire to see a portion that he or she missed. In other cases, the individual may wish that he or she recorded an entire program only after viewing a first portion. Scheduling a recording or waiting for a time when a program is to be re-aired can be inconvenient or impossible. Additionally, a viewer may not desire to pay for an entire program via a video-on-demand channel, only to see the portion that he or she missed.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
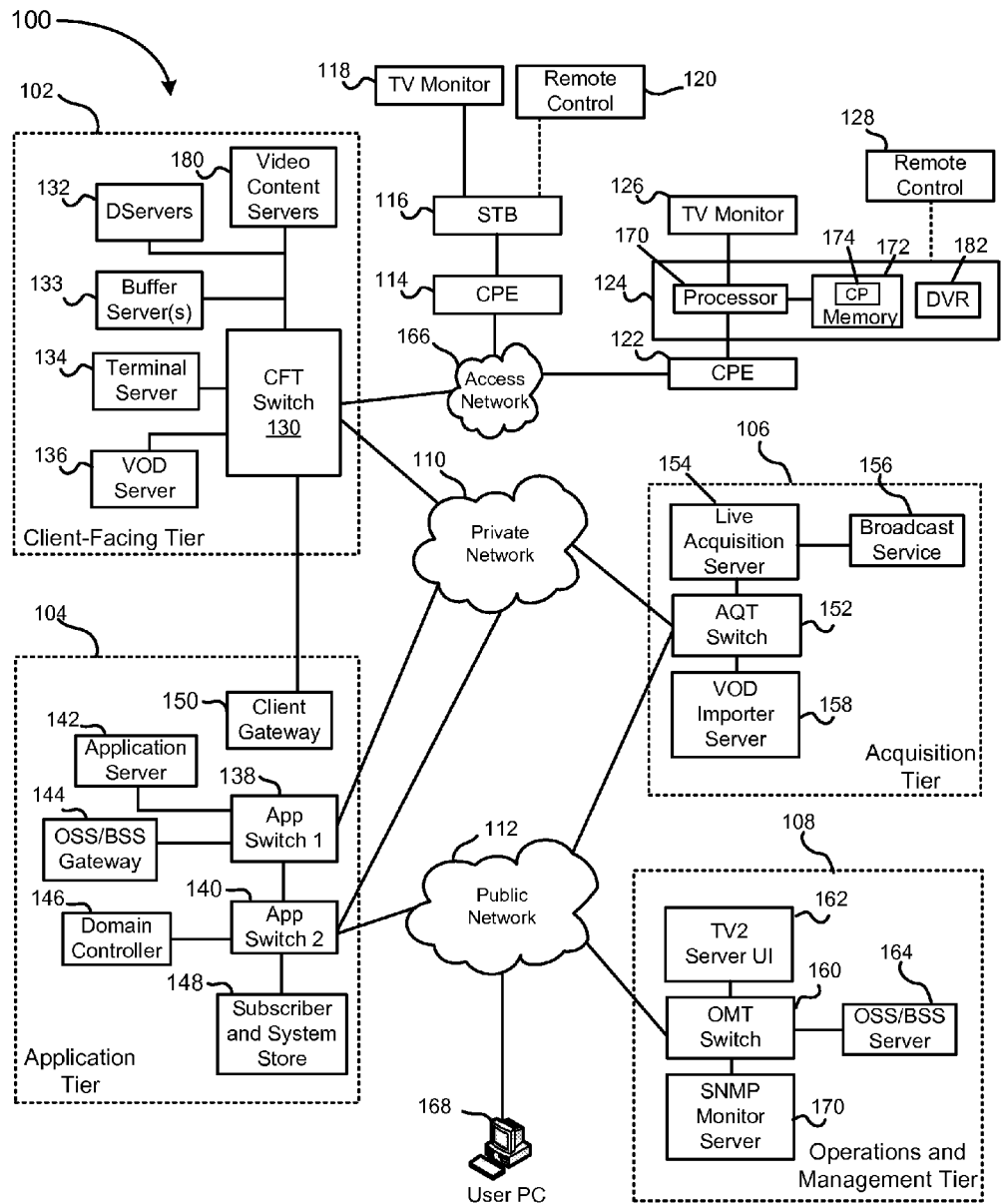
FIG. 1 is a block diagram illustrating a first embodiment of a system to deliver video content.

FIG. 1 shows an IPTV system 100 including a client facing tier 102, an application tier 104, an acquisition tier 106, and an operations and management tier 108. Each tier 102, 104, 106, and 108 is coupled to a private network 110, a public network 112, or both the private network 110 and the public network 112. For example, the client-facing tier 102 can be coupled to the private network 110, while the application tier 104 can be coupled to the private network 110 and to a public network, such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) access network. In an illustrative embodiment, customer premises equipment (CPE) such as a first CPE device 114 and a second CPE device 122 can be coupled to the private access network 166. The CPE devices 114 and 122 can include modems (e.g., digital subscriber line modems), residential gateways, routers, other devices, or any combination thereof. The client-facing tier 102 can communicate with a first representative set-top box (STB) device 116 via the first CPE device 114 and with a second representative set-top box device 124 via the second CPE device 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the CPE devices 114 and 122 via fiber optic cables. Alternatively, the CPE devices 114 and 122 can be digital subscriber line (DSL) modems that are coupled to one or more network nodes via twisted pairs, and the client-facing tier 102 can be coupled to the network nodes via fiber-optic cables. Each of the set-top box devices 116 and 124 can process data received from the private access network 166 via an IPTV software platform such as Microsoft™ TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each of the set-top box devices 116 and 124 can receive data or video from the client-facing tier 102 via the private access network 166 and render or display the data or video at the display device 118 or 126 to which it is coupled. The set-top box devices 116 and 124 may include tuners that receive and decode television programming information for transmission to the display devices 118 and 126. Further, each of the set-top box devices 116 and 124 can include processing logic and memory accessible to the processing logic, such as the STB processor 170 and the STB memory device 172. Each STB memory device may include one or more computer programs, such as the computer program 174, that are executable by the STB processing logic. In one embodiment, one or more of the set-top box devices 116 and 124 may include integrated digital video recorder (DVR) devices or components, such as the DVR 182. In other embodiments, one or more of the set-top box devices 116 and 124 can be coupled to external DVR devices.

In an illustrative embodiment, the client-facing tier 102 can include a client-facing tier (CFT) switch 130 that manages communication between the client-facing tier 102 and the private access network 166, and between the client-facing tier 102 and the private network 110. As shown, the CFT switch 130 is coupled to one or more distribution servers (D-servers) 132 that may receive and store video content, requests, other data, or any combination thereof, which is bound to and from the set-top box devices 116 and 124. The CFT switch 130 can also be coupled to a terminal server 134 that provides terminal devices with a common connection point to the private network 110. In a particular embodiment, the CFT switch 130 can also be coupled to a video-on-demand (VOD) server 136.

Further, the CFT switch 130 is coupled to one or more buffer servers 133 that store video content associated with television programs and provide backfill video content to DVR devices integrated with or external to the set-top box devices 116 and 124. The CFT switch 130 is also coupled to a plurality of video servers 180 that store video content that is to be distributed via the access network 166 in response to requests from the set-top box devices 116 and 124. In an illustrative, non-limiting embodiment, each of the video servers 180 can be associated with one or more channels provided via the access network 166.

The application tier 104 can communicate with both the private network 110 and the public network 112. In this embodiment, the application tier 104 can include a first application tier (APP) switch 138 and a second APP switch 140. The first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166. Such applications enable the set-top box devices 116 and 124 to provide functions such as display, messaging, processing of IPTV data and VOD material, gaming functions, other functions, or any combination thereof. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, (e.g., it is connected to a different twisted pair), the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicates the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162 that is adapted to provide a TV2 user interface to user computers 168 via the public network 112, for example. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment, the buffer server(s) 133 are adapted to receive and store video content provided by the video server(s) 180. A set-top box device, such as the second representative set-top box device 124, is adapted to receive a channel change command and to send data indicating the channel change command to the CFT switch 130 via the access network 166. The CFT switch 130 is adapted to send the data to a D-server 132, to a video server 180 associated with a requested channel, or any combination thereof, and the set-top box device 124 is adapted to receive video content associated with a program provided via the requested channel from the D-server 132 or the video server 180, beginning at a receipt time.

In addition, a buffer server 133 receives data indicating the channel change command. The buffer server 133 can receive the data via the CFT switch 130 from a D-server 132, from a video server 180, from the set-top box device 124, from a DVR device coupled to the set-top box device 124, from another element of the system 100, or any combination thereof. The data received at the buffer server 133 can indicate a requested channel and the receipt time at which the set-top box device 124 began receiving video content associated with a program provided via the channel. The buffer server 133 is adapted to unicast a portion of the program to the set-top box device 124 (e.g., where the DVR 182 is integrated with the set-top box device 124 or where the DVR communicates with the access network 166 via the set-top box device 124), or to a DVR device communicating with the set-top box device 124. The portion of the program ("backfill content") that the buffer server 133 sends includes video content extending from a start time of the program to the set-top box receipt time.

The set-top box device 124 is adapted to send the received video content to a display device, such as the television monitor 118. The set-top box device 124 is adapted to receive a REVERSE command or similar command to view previous video content associated with the program. Further, the set-top box device 124 is adapted to retrieve some or all of the backfill content associated with the program from the DVR 182, when the previous video content requested via the REVERSE command includes a time, frame, or position prior to the receipt time.

In an illustrative embodiment, the buffer server 133 can delete video content associated with the program when the buffer server receives data indicating that the video content is no longer to be made available, such as when a program ends.

Figure 2:
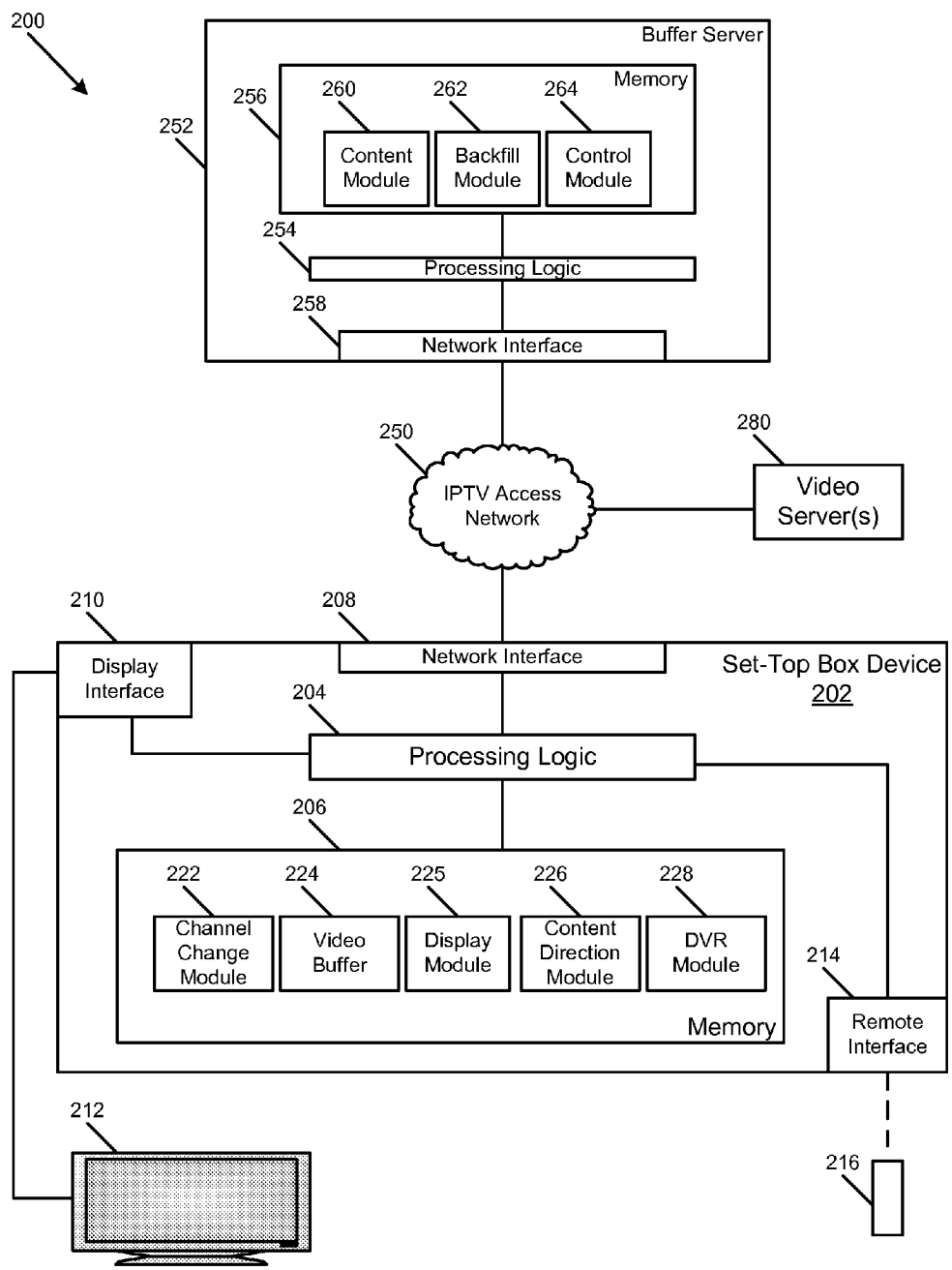
FIG. 2 is a block diagram illustrating a second embodiment of a system to deliver video content.

FIG. 2 illustrates a second embodiment of a system 200 to deliver video content. The system 200 includes a set-top box device 202 that communicates with a buffer server 252 and at least one video server 280 via a video distribution network, such as an Internet Television Protocol (IPTV) access network 250. The buffer server 252 and the at least one video server 280 can be associated with a video head-end (VHE) of the video distribution network. The set-top box device 202 includes processing logic 204 and includes a network interface 208 that is adapted to facilitate communication between the set-top box device 202 and the IPTV access network 250. In an illustrative embodiment, the network interface 208 can communicate with the IPTV access network 250 via a residential gateway or other customer premises equipment (not shown). In addition, the set-top box device 202 includes a display interface 210 coupled to a display device 212, such as a television. The set-top box device 202 also includes a remote interface 214 adapted to communicate with a remote control device 216.

In a particular embodiment, the memory 206 includes a plurality of modules 222-228. The modules 222-228 can include computer instructions that are readable and executable by the processing logic 204 to implement various functions of the set-top box device 202 with respect to delivering video content. For example, the modules 222-228 can represent various aspects of one or more software applications, operating systems, or other computer programs. In other embodiments, the modules 222-228 can be implemented as hardware logic or a combination of hardware logic and computer instructions.

The memory 206 includes a channel change module 222 that is executable by the processing logic 204 to receive a channel change command and to send data indicating the channel change command to the video head-end of the video distribution network. For example, the set-top box device can send data to the buffer server 252, the video server(s) 280, or a combination thereof, via the IPTV access network 250.

Further, the memory 206 includes a video buffer 224 to receive and buffer video content associated with a program provided via a requested channel. The set-top box device 202 begins receiving the video content at a receipt time. The memory 206 includes a display module 225 that is executable by the processing logic 204 to send the received video content to the display device 212. The display module 225 is also executable by the processing logic 204 to send previous video content associated with the program to the display device 212 in response to a REVERSE command or similar command.

In addition, the memory 206 includes a content direction module 226 that is executable by the processing logic 204 to determine whether it has received a REVERSE command or similar command to view previous video content associated with the program. For example, a REVERSE command can be received at the set-top box device 202 from the remote control device 216 via the remote interface 214. The REVERSE command can indicate that the video content shown at the display device 212 is to move to a prior time, frame or position in the program. In one embodiment, the content direction module 226 can be executable by the processing logic 204 to receive a PLAY command, RESUME command or similar command, indicating the prior time, frame or position in the program.

In a particular embodiment, the content direction module 226 is executable by the processing logic 204 to determine whether the requested previous content includes a time, frame or position before the receipt time at which the set-top box device 202 began receiving video content associated with the program. The content direction module 226 is executable by the processing logic 204 to retrieve previous content associated with the program from an external DVR device or from a DVR element of the set-top box device, such as the DVR module 228. Previous video content extending between a start of the program and the receipt time ("backfill content") can be received at the set-top box device 202 in response to the channel change data sent by the set-top box device 202, and the set-top box device 202 can store the backfill content at the DVR module 228.

The buffer server 252 includes processing logic 254 and memory 256 accessible to the processing logic 254. The buffer server 252 also includes a network interface 258 that is adapted to facilitate communication between the buffer server 252 and the IPTV access network 250. In a particular embodiment, the memory 256 includes a plurality of modules 260-264. The modules 260-264 can include computer instructions that are readable and executable by the processing logic 254 to implement various functions of the buffer server 252 with respect to delivering video content. For example, the modules 260-264 can represent various aspects of one or more software applications, operating systems, or other computer programs. In other embodiments, the modules 260-264 can be implemented as hardware logic or a combination of hardware logic and computer instructions.

The memory 256 includes a content module 260 that is executable by the processing logic 254 to receive and store content from one or more of the video server(s) 280. Further, the memory 256 includes a backfill module 262 that is executable by the processing logic 254 to receive data indicating a channel change at the set-top box device 202. The data can indicate that a channel corresponding to a video server 280 has been requested and a receipt time at which the set-top box device 202 began receiving video content associated with a program. The data can be received from the set-top box device 202, from a digital video recorder (DVR) communicating with the set-top box device 202, or from a video server 280, switch or other network element that received data indicating the channel change from the set-top box device 202. The backfill module 262 is executable by the processing logic 254 to unicast backfill content extending from a start time of the program to the receipt time, to the set-top box device 202 or to a DVR device communicating with the set-top box device 202.

In addition, the memory 256 includes a control module 264 that is executable by the processing logic 254 to determine whether the buffer server 252 has received data indicating that video content associated with a program is no longer to be made available to set-top box devices as backfill content. The control module 264 is executable by the processing logic 254 to delete the video content associated with the program when the buffer server receives data indicating that the video content is no longer to be made available.

Figure 3:
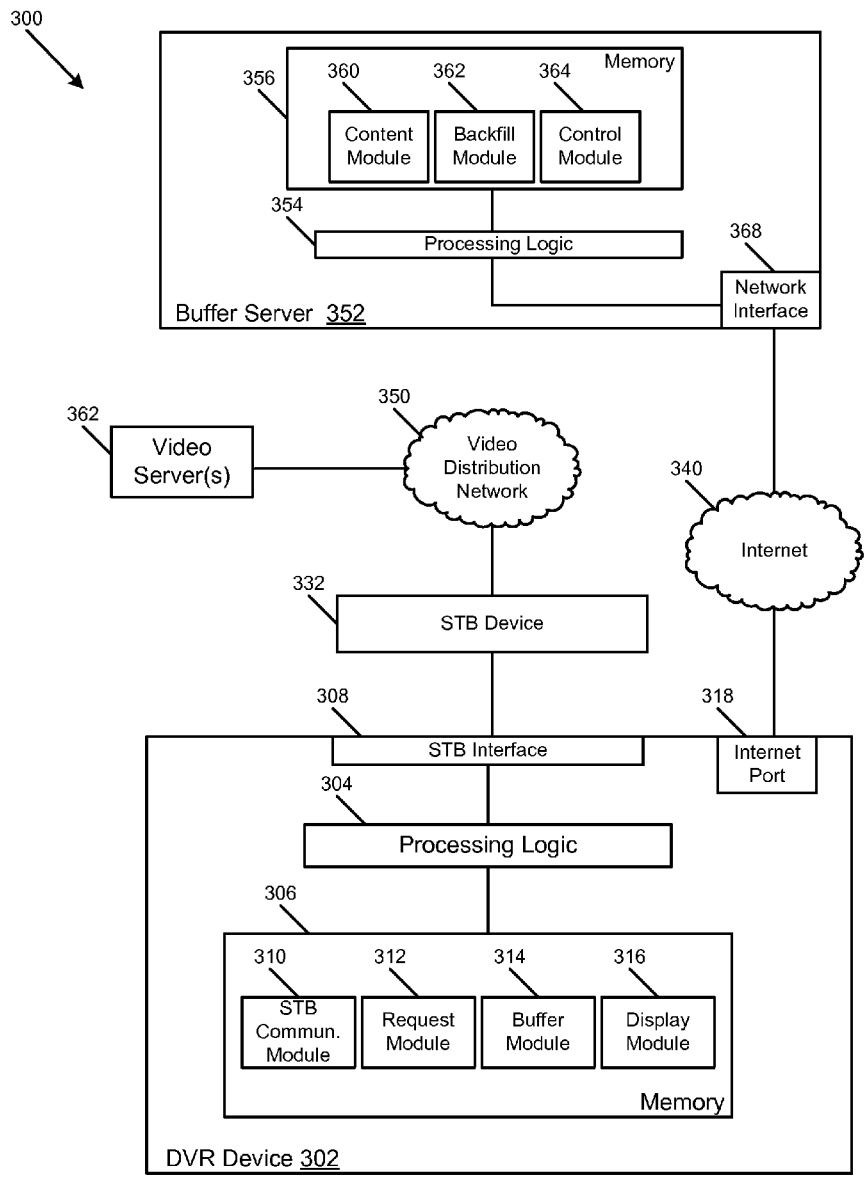
FIG. 3 is a block diagram illustrating a third embodiment of a system to deliver video content.

FIG. 3 illustrates a third embodiment of a system 300 to deliver video content. The system 300 includes a digital video recorder (DVR) device 302 that communicates with a buffer server 352 via the Internet 340. The DVR device 302 also communicates with a set-top box device 332. The set-top box device 332 communicates with at least one video server 362 via a video distribution network 350, such as a cable network, a home satellite network, or an Internet Protocol Television (IPTV) network.

The DVR device 302 includes processing logic 304 and memory 306 accessible to the processing logic 304. The DVR device 302 also includes a set-top box interface 308 that is adapted to facilitate communication between the DVR device 302 and the set-top box device 332. Further, the DVR device 302 includes an Internet port 318 that facilitates communication between the DVR device 302 and the buffer server 352 via the Internet 340.

In a particular embodiment, the DVR memory 306 includes a plurality of modules 310-316. The modules 310-316 can include computer instructions that are readable and executable by the processing logic 304 to implement various functions of the DVR device 302 with respect to delivering video content. For example, the modules 310-316 can represent various aspects of one or more software applications, operating systems, or other computer programs. In other embodiments, the modules 310-316 can be implemented as hardware logic or a combination of hardware logic and computer instructions.

The memory 306 includes a set-top box (STB) communication module 310 that is executable by the processing logic 304 to receive data from the set-top box device 332 indicating that the set-top box device 332 has received a channel change command. The memory 306 includes a request module 312 that is executable by the processing logic 304 to send a backfill request to the buffer server 352 via the Internet 340. The backfill request indicates that a portion of video content ("backfill content") associated with a program broadcast via the requested channel is to be sent to the DVR device 302. The backfill content includes video content extending from a start time of the program to a time at which the set-top box device 332 began receiving video content associated with the program.

Further, the memory 306 includes a buffer module 314 to buffer backfill content received from the buffer server 352 in response to the backfill request. The STB communication module 310 is executable by the processing logic 304 to send some or all of the backfill content to the set-top box device 332 in response to a request received at the DVR device 302 from the set-top box device 332. In an illustrative embodiment, the memory 306 can include a control module 316 that is executable by the processing logic 304 to delete backfill content associated with the program in response to data received from the set-top box device 332 (e.g., if the program ends, if data indicating another channel change is received, or if the DVR device 302 receives a command to delete the backfill content).

The buffer server 352 includes processing logic 354 and memory 356 accessible to the processing logic 354. The buffer server 352 also includes a network interface 358 that is adapted to facilitate communication between the buffer server 352 and the IPTV access network 350. In a particular embodiment, the memory 356 includes a plurality of modules 360-364. The modules 360-364 can include computer instructions that are readable and executable by the processing logic 354 to implement various functions of the buffer server 352 with respect to delivering video content. For example, the modules 360-364 can represent various aspects of one or more software applications, operating systems, or other computer programs. In other embodiments, the modules 360-364 can be implemented as hardware logic or a combination of hardware logic and computer instructions.

The memory 356 includes a content module 360 that is executable by the processing logic 354 to receive and store content from one or more of the video server(s) 362. Further, the memory 356 includes a backfill module 362 that is executable by the processing logic 354 to receive data indicating a channel change at the set-top box device 302. The data can indicate that a channel corresponding to a video server 362 has been requested and a time at which the set-top box device 302 began receiving video content associated with a program. The data can be received from the set-top box device 332, from the DVR device 302, or from a video server 362, switch or other network element that received data indicating the channel change from the set-top box device 332. The backfill module 362 is executable by the processing logic 354 to unicast a portion of the program to the DVR device 302 via the set-top box device 332 or the Internet 340, where the sent portion extends from a start time of the program to the set-top box receipt time.

In addition, the memory 356 includes a control module 364 that is executable by the processing logic 354 to determine whether the buffer server 352 has received data indicating that video content associated with a program is no longer to be made available to set-top box devices as backfill content. The control module 364 is executable by the processing logic 354 to delete the video content associated with the program when the buffer server receives data indicating that the video content is no longer to be made available.

Figure 4:
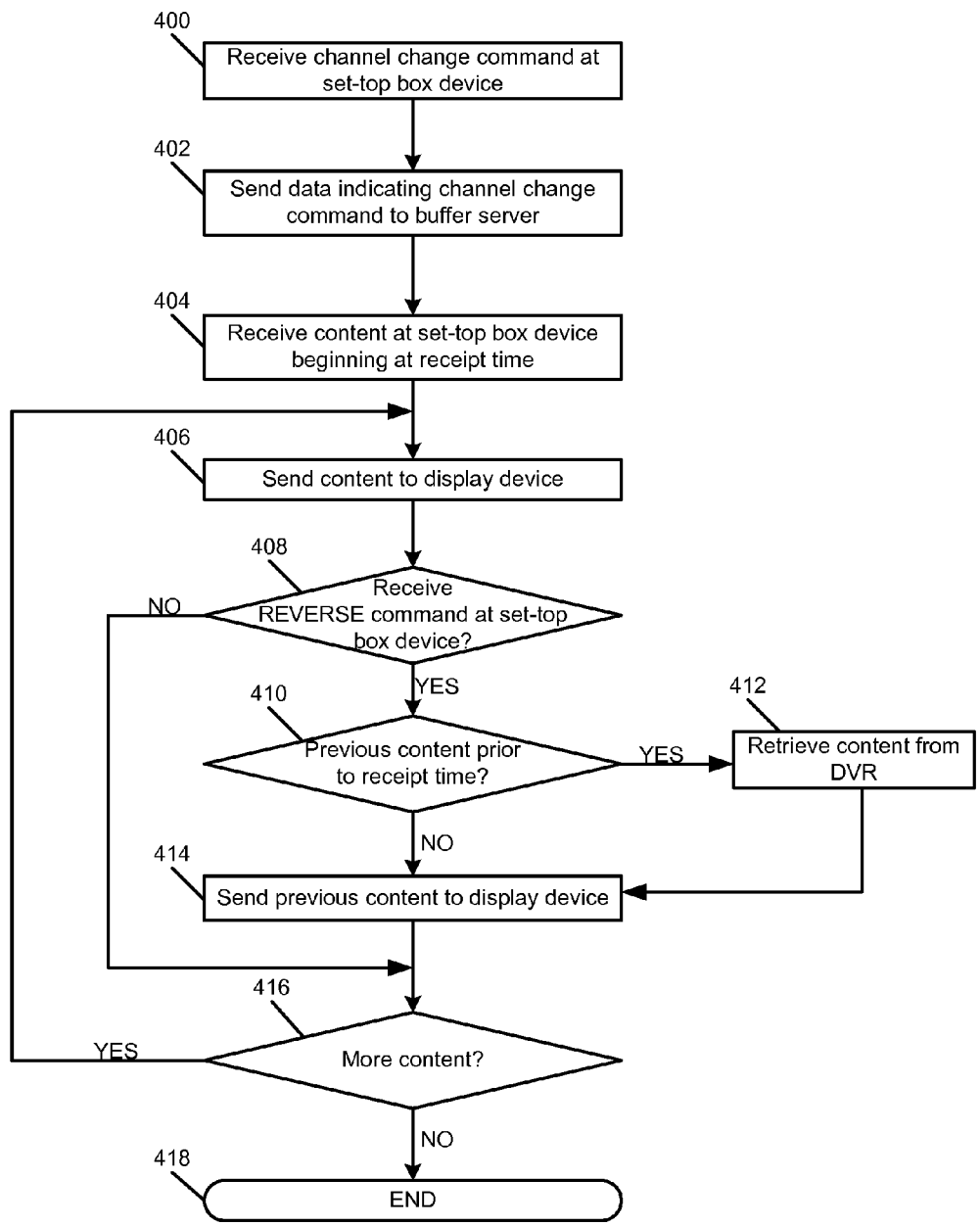
FIG. 4 is a flow diagram illustrating a particular embodiment of a method of delivering video content.

FIG. 4 illustrates a particular embodiment of a method of delivering video content. At block 400, a set-top box device receives a channel change command. Moving to block 402, the set-top box device sends data indicating the channel change command to a video head-end (VHE) of a video distribution network. For example, where the video distribution network is an Internet Protocol Television (IPTV) network, the set-top box device can send data to a video server, a distribution server, a buffer server, or a combination thereof, via an access network. In another example, where the video distribution network is a cable or satellite network, the set-top box device can send the data to the buffer server via a data network, such as the Internet. The channel change request identifies a requested channel. Proceeding to block 404, the set-top box device begins receiving video content associated with a program broadcast via the requested channel. The set-top box device begins receiving the video content at a receipt time. Continuing to block 406, the set-top box device sends the received video content to a display device coupled to the set-top box device.

Advancing to decision node 408, the set-top box device determines whether it has received a REVERSE command or similar command to view previous video content associated with the program. For example, a user may issue a REVERSE command to move to a prior position in the program and then issue a PLAY command, RESUME command or similar command, to view the program beginning at a prior time, frame or position in the program. If the set-top box device does not receive a REVERSE command or similar command, the method moves to decision node 416. Conversely, if the set-top box device determines that it has received a REVERSE command or similar command, the method moves to decision node 410, and the set-top box device determines whether the requested previous content extends before the receipt time at which the set-top box device began receiving the program.

If the requested previous content does not extend before the receipt time, the method proceeds to block 414. On the other hand, if the previous content extends before the receipt time, the method continues to block 412, and the set-top box device retrieves requested previous content associated with the program from an external DVR device or from a DVR element of the set-top box device. In a particular embodiment, previous video content extending between a start of the program and the receipt time can be sent to the DVR device or set-top box device as backfill content in response to the channel change request issued by the set-top box device. The method then continues to block 414.

At block 414, the set-top box device sends the previous video content to the display device. The previous video content can be displayed in a reverse direction until the user selects a new starting point, or the previous video content can begin display at a selected starting point. The set-top box device can retrieve the previous video content from memory at the set-top box device, at an internal or external digital video recorder device, or from a server or other device at the VHE. Moving to decision node 416, the set-top box device determines whether there is additional video content associated with the program to be sent to the display device. If there is additional content associated with the program to be displayed at the display device, the method can return to block 406. Whereas, if there is no additional content associated with the program (e.g., when an end of the program is reached or the set-top box device is powered off) the method terminates at 418.

Figure 5:
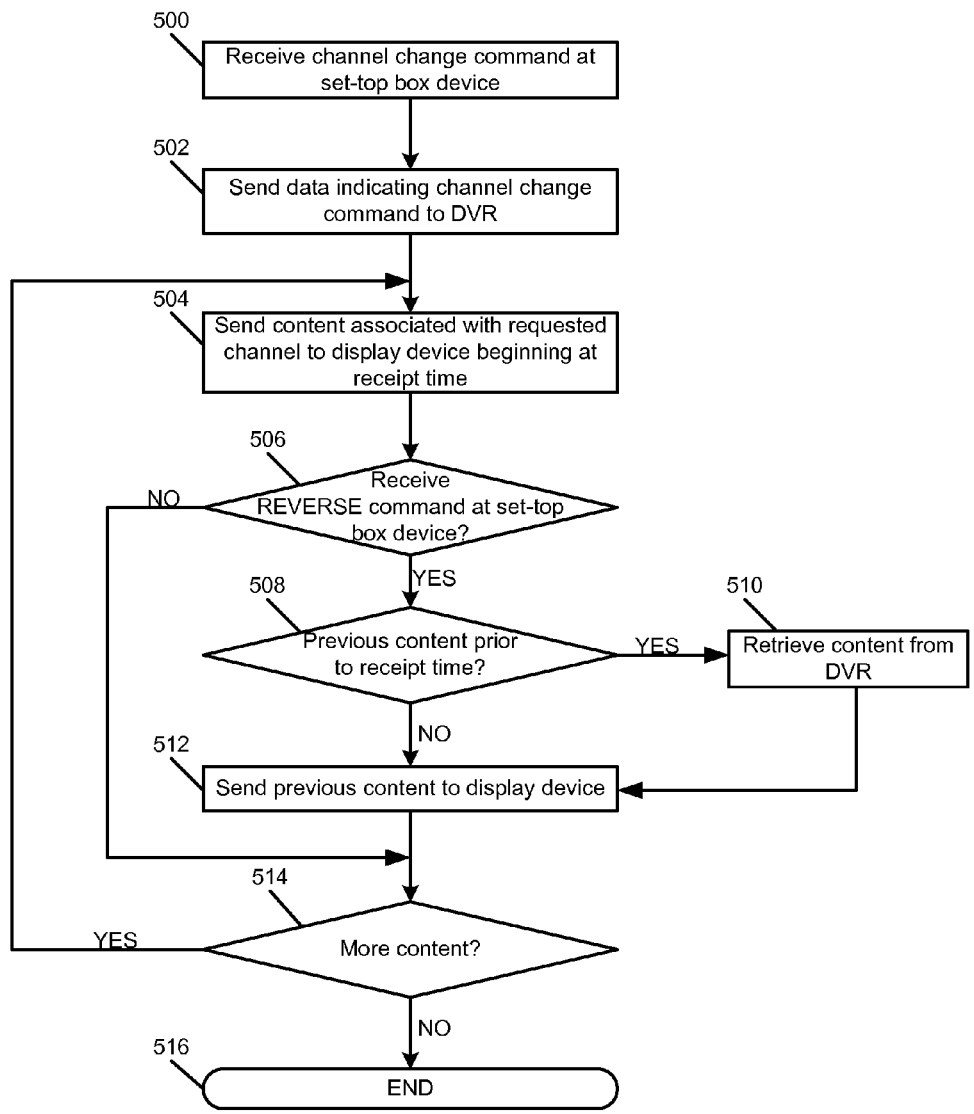
FIG. 5 is a flow diagram illustrating a second particular embodiment of a method of delivering video content.

FIG. 5 illustrates a second particular embodiment of a method of delivering video content. At block 500, a set-top box device receives a channel change command. Moving to block 502, the set-top box device sends data indicating the channel change command and a requested channel to an external digital video recorder (DVR) device. Proceeding to block 504, the set-top box device begins sending video content associated with a program broadcast via the requested channel to a display device coupled to the set-top box device. For instance, the set-top box device can be associated with a cable network, a satellite network, or other unidirectional video distribution network, in which all available channels are buffered at the set-top box device.

Advancing to decision node 506, the set-top box device determines whether it has received a REVERSE command or similar command to view previous video content associated with the program. For example, a user may issue a REVERSE command to move to a prior position in the program and then issue a PLAY command, RESUME command or similar command, to view the program beginning at a prior time, frame or position in the program. If the set-top box device does not receive a REVERSE command or similar command, the method moves to decision node 514. Conversely, if the set-top box device determines that it has received a REVERSE command or similar command, the method moves to decision node 508, and the set-top box device determines whether the requested previous content extends before the receipt time at which the set-top box device began receiving the program.

If the requested previous content does not extend before the receipt time, the method proceeds to block 512. On the other hand, if the previous content extends before the receipt time, the method continues to block 510, and the set-top box device retrieves requested previous content associated with the program from the external DVR device. In a particular embodiment, previous video content extending between a start of the program and the receipt time can be sent to the DVR device in response to the data sent by the set-top box device to the VHE indicating the channel change command. The method then continues to block 512.

At block 512, the set-top box device sends the previous video content to the display device. The previous video content can be displayed in a reverse direction until the user selects a new starting point, or the previous video content can begin display at a selected starting point. The set-top box device can retrieve the previous video content from memory at the set-top box device, at an internal or external digital video recorder device, or from a server or other device at the VHE. Moving to decision node 514, the set-top box device determines whether there is additional video content associated with the program to be sent to the display device. If there is additional content associated with the program to be displayed at the display device, the method can return to block 504. Whereas, if there is no additional content associated with the program (e.g., when an end of the program is reached or the set-top box device is powered off) the method terminates at 516.

Figure 6:
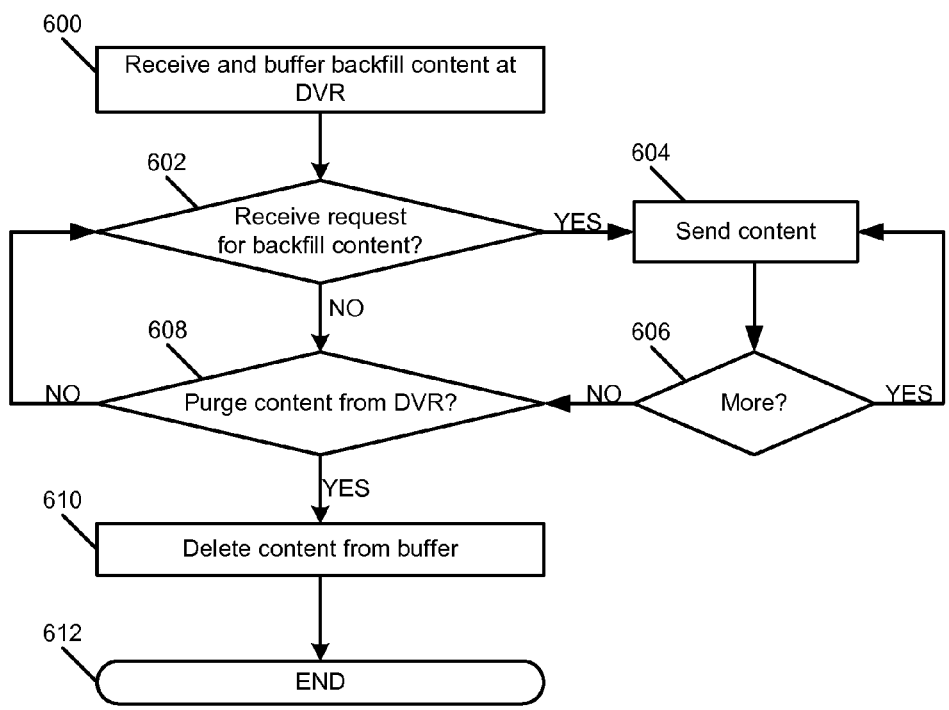
FIG. 6 is a flow diagram illustrating a third particular embodiment of a method of delivering video content.

FIG. 6 illustrates a third particular embodiment of a method of delivering video content. At block 600, a digital video recorder (DVR) receives and buffers backfill content from a buffer server. In one embodiment, the backfill content can be sent by the buffer server in response to data indicating a channel change command at a set-top box device coupled to the DVR, or with which the DVR is integrated. Continuing to decision node 602, the DVR determines whether it has received a request for any of the backfill content. If the DVR does not receive such a request, the method advances to decision node 608. Whereas, if the DVR receives a request for backfill content, the method moves to block 604, and the DVR sends the requested backfill content to the set-top box device. Proceeding to decision node 606, the DVR determines whether more backfill content is to be sent to the set-top box device. If additional backfill content is to be sent to the set-top box device, the method returns to block 604. Conversely, if no additional content is to be sent to the set-top box device, the method advances to decision node 608.

At decision node 608, the DVR determines whether it is to delete the backfill content from its buffer. If the DVR determines that it is not to delete the backfill content, the method can return to decision node 602. On the other hand, if the DVR determines that it is to delete the backfill content (e.g., if the program ends, if data indicating another channel change is received, or if the DVR receives a command to delete the backfill content), the method proceeds to block 610, and the DVR deletes the backfill content from its buffer. The method terminates at 612.

Figure 7:
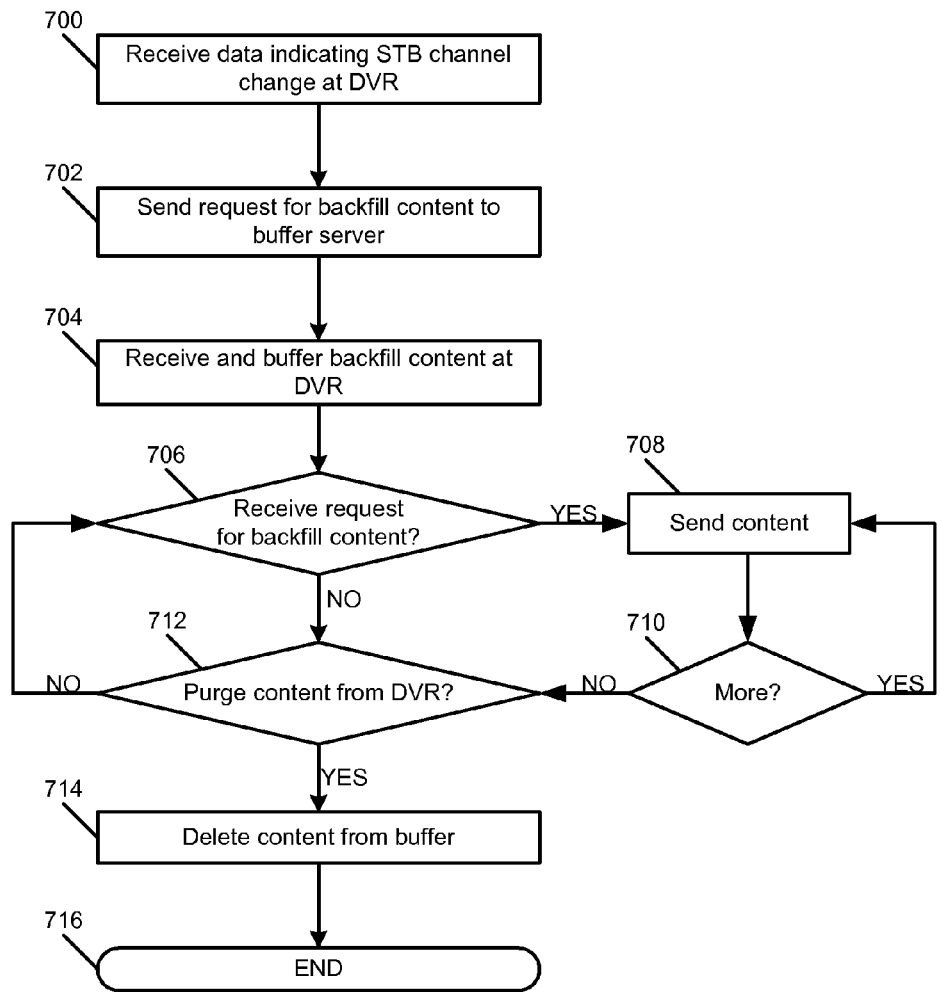
FIG. 7 is a flow diagram illustrating a fourth particular embodiment of a method of delivering video content.

FIG. 7 illustrates a fourth particular embodiment of a method of delivering video content. At block 700, a digital video recorder (DVR) receives data from a set-top box device indicating that the set-top box device has received a channel change command. The data indicates a requested channel. Moving to block 702, the DVR sends a backfill request to a buffer server via a data network, such as the Internet. The backfill request indicates that a portion of video content ("backfill content") associated with a program broadcast via the requested channel is to be sent to the DVR, where the portion of video content extends from a start time of the program to a time at which the set-top box device began receiving video content associated with the program.

Proceeding to block 704, the DVR receives and buffers the backfill content. Continuing to decision node 706, the DVR determines whether it has received a request from the set-top box device for any of the backfill content. If the DVR does not receive such a request, the method advances to decision node 712. Whereas, if the DVR receives a request for backfill content, the method moves to block 708, and the DVR sends the requested backfill content to the set-top box device. Proceeding to decision node 710, the DVR determines whether more backfill content is to be sent to the set-top box device. If additional backfill content is to be sent to the set-top box device, the method returns to block 708. Conversely, if no additional backfill content is to be sent to the set-top box device, the method advances to decision node 712.

At decision node 712, the DVR determines whether it is to delete the content from its buffer. If the DVR determines that it is not to delete the content, the method can return to decision node 706. On the other hand, if the DVR determines that it is to delete the backfill content (e.g., if the program ends, if data indicating another channel change is received, or if the DVR receives a command to delete the backfill content), the method proceeds to block 714, and the DVR deletes the backfill content from its buffer. The method terminates at 716.

Figure 8:
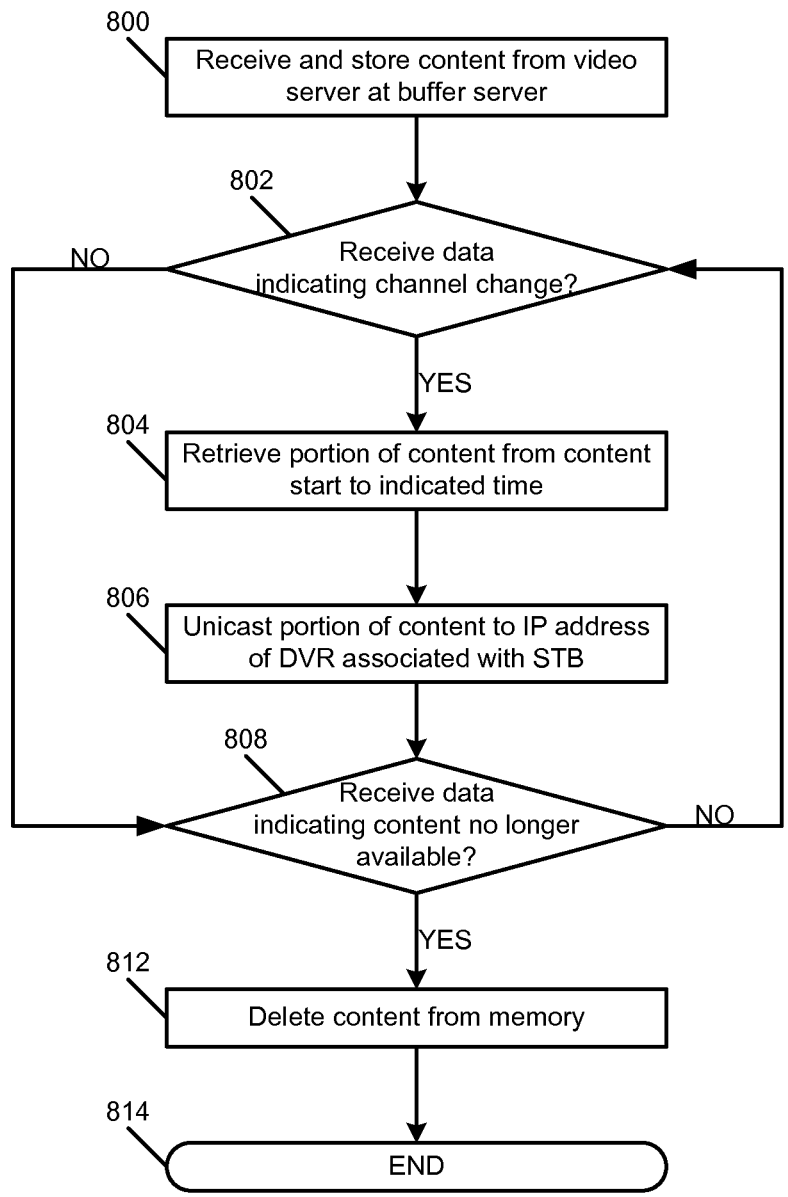
FIG. 8 is a flow diagram illustrating a fifth particular embodiment of a method of delivering video content.

FIG. 8 illustrates a fifth particular embodiment of a method of delivering video content. At block 800, a buffer server receives and stores content from a video server. Moving to decision node 802, the buffer server determines whether it has received data indicating a channel change at a set-top box device. The data can indicate a requested channel, such as a channel corresponding to the video server, and a time at which the set-top box device began receiving video content associated with a program provided via the requested channel. The data can be received from a set-top box device, a digital video recorder (DVR) communicating with the set-top box device, or from a video server, switch or other network element that received a channel change request from the set-top box request. If the buffer server does not receive data indicating a channel change, the method can advance to decision node 808. Whereas, if the buffer server determines that it has received data indicating a channel change at a set-top box device, the method can proceed to block 804.

Proceeding to block 804, the buffer server retrieves a portion of a program provided via the requested channel that extends from a start time of the program to the set-top box receipt time. Continuing to block 806, the buffer server unicasts the portion of the program to an Internet Protocol (IP) address of the set-top box device or a DVR communicating with the set-top box device. Advancing to decision node 808, the buffer server determines whether it has received data indicating that video content associated with the program is no longer to be made available to set-top box devices as backfill content. If the buffer server has not received such an indication, the method can return to decision node 802. Whereas, if the buffer server receives data indicating that the video content is no longer to be made available, the method moves to block 812, and the buffer server deletes the video content. The method terminates at 814.

In some embodiments, the methods disclosed herein can be performed as described with reference to FIGS. 4-8. In other embodiments, aspects of the methods can be performed in alternative sequences or simultaneously.

Figure 9:
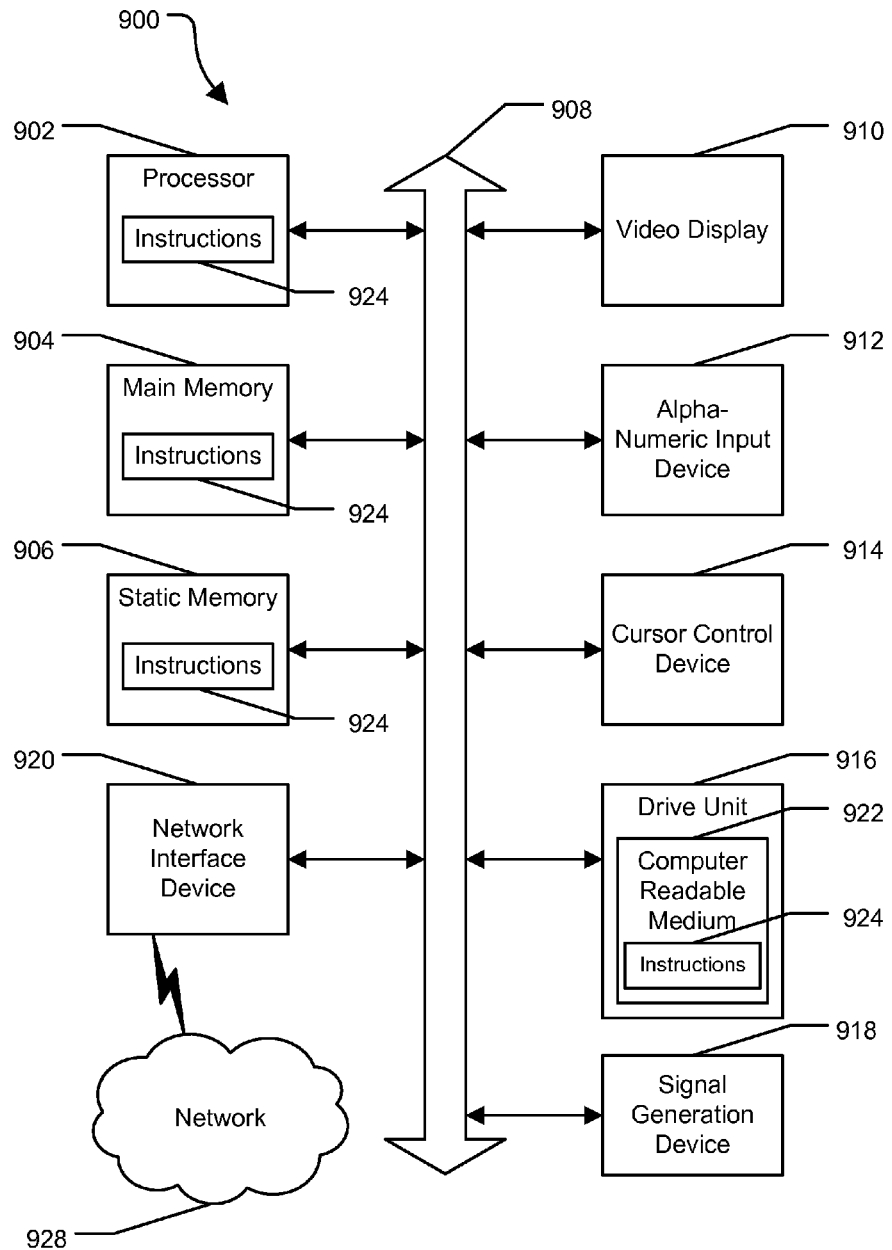
FIG. 9 is a block diagram illustrating a general computer system.

FIG. 9 shows an illustrative embodiment of a general computer 900 including a set of instructions that can be executed to cause the computer system to perform any one or more of the methods or computer based functions disclosed herein. The computer system 900 may operate as a standalone device or may be connected, e.g., using a network, to other computer systems or peripheral devices. In an illustrative embodiment, such standalone and peripheral devices can include, for example, set-top box devices, buffer servers, video servers, digital video recorders (DVRs), other devices, or any combination thereof, as illustrated in FIGS. 1-3.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902, e.g., a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media. The network interface device 920 can provide connectivity to a network 926, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
    sending, by a set-top box device comprising a processor, a channel change request to a video head-end of a video distribution network, the channel change request identifying a requested channel;
    receiving, by the set-top box device, responsive to the channel change request, first video content associated with a multicast of a program provided from the video head-end in response to the sending of channel change request, the video content beginning from a first point in the multicast of the program, the first point being a time at which the set-top box device began receiving the multicast of the program;
    retrieving, by the set-top box device, responsive to the channel change request, backfill video content from a digital video recorder associated with a second point in the multicast of the program, the second point being a time occurring prior to the first point and being only during the multicast of the program without directly retrieving the backfill video content from the video head-end, wherein the second point extends back to a point at which the digital video recorder has the backfill video content for the multicast of the program;
    retrieving, by the set-top box, responsive to sending the channel change request, a unicast over a connection from a buffer server at the video head-end to a port of the digital video recorder, wherein the unicast comprises additional video content associated with the multicast of the program occurring prior to the second point of the backfill video content to a beginning time of the multicast of the program, wherein the set-top box device is provided in proximity to the digital video recorder and is connected with the digital video recorder via a hardwire interface, wherein the backfill video content comprises second video content associated with the multicast of the program extending from a start time of the multicast of the program to the first point;

monitoring for receipt of a subsequent channel change command at the set-top box device; and providing a subsequent channel change signal from the set-top box device to the digital video recorder based on detecting the receipt of the subsequent channel change command at the set-top box device, wherein the backfill content is deleted from the digital video recorder in response to one of the subsequent channel change signal, data indicating that the multicast of the program has ended, or a command to delete the backfill content.

2. The method of claim 1, further comprising determining whether the command to view previous video content associated with the program requests video content associated with the program prior to the first point, before retrieving the at least a portion of the backfill content.

3. The method of claim 1, wherein the backfill video content is limited to additional video content associated with the program between the start time of the program and the first point.

4. The method of claim 1, wherein the retrieval of the backfill video content is limited to being performed during the multicast of the program to the set-top box device, and wherein the digital video recorder is an integral component of the set-top box.

5. The method of claim 1, further comprising:
presenting the at least a portion of the backfill video content in reverse until user input associated with a starting point is received,
wherein the backfill video content is deleted from the digital video recorder when the multicast of the program ends.

6. A method, comprising:
receiving, by a buffer server comprising a processor, first video content of a multicast presentation of a program;
storing, by the buffer server, during the multicast presentation of the program, the first video content of the multicast presentation of the program;
receiving, by the buffer server, during the multicast presentation of the program, data identifying a requested channel associated with a channel change command received at a set-top box device and identifying a set-top box device receipt time at a same time as the change channel command, wherein the set-top box device begins receiving second video content associated with the multicast presentation of the program provided via the requested channel, the second video content being received at the set-top box from a point in the program that corresponds to the set-top box receipt time corresponding to a time at which the set-top box device begins receiving the multicast presentation of the program, wherein the set-top box buffers the second video content; and
sending, at the same time as the change channel command, by the buffer server, during the multicast presentation of the program, a unicast presentation of backfill video content associated with the program to a digital video recorder connected with the set-top box device via a hardwire interface wherein the unicast comprises additional video content associated with the multicast of the program occurring prior to a starting point of the backfill video content to a beginning time of the multicast of the program, wherein the set-top box is in proximity to the digital video recorder, and wherein the backfill video content consists of video content associated with the program extending from the set-top box device receipt time towards the beginning time, wherein the backfill content is stored by the digital video recorder;

monitoring for receipt of a subsequent channel change command at the set-top box device;

providing a subsequent channel change signal from the set-top box device to the digital video recorder based on detecting the receipt of the subsequent channel change command at the set-top box device, wherein the backfill content is deleted from the digital video recorder in response to one of the subsequent channel change signal, data indicating that the video content is no longer to be made available at the buffer server, or a command to delete the backfill content; and storing the first video content of the multicast presentation of the program extending from a start of the multicast of the program to an end of the multicast presentation of the program at the buffer server, and wherein the first video content is received from a video server at a video head-end of a video distribution network.

7. The method of claim 6, wherein the sending comprises unicasting the backfill video content to an internet protocol address of the digital video recorder for receipt by the digital video recorder at an internet port of the digital video recorder.

8. The method of claim 6, wherein the unicast of the backfill video content is performed only during a scheduled delivery of the multicast presentation of the program, and wherein the backfill video content is rendered no longer accessible when a subsequent channel change command is received at the set-top box device.

9. The method of claim 6, further comprising: receiving, by the buffer server, data indicating that the first video content is no longer to be made available as backfill video content associated with the program to set-top box devices; and
deleting the first video content stored at the buffer server.

10. A system, comprising:
a digital video recorder including first and second interfaces and being in proximity to a set-top box device, the first interface to receive a unicast presentation of backfill video content from a buffer server in response to a channel change command issued from at the set-top box device, and the second interface to place the digital video recorder in communication with the set-top box device for delivery of a portion of the backfill video content to the set-top box device, wherein the set-top box, in response to the channel change command, buffers video content associated with a multicast presentation of a program occurring subsequent to a set-top box device receipt time, wherein, at a same time as the change channel command, the backfill video content is obtained from video content of the multicast presentation of the program buffered by the buffer server and provided to the set-top box device over a video distribution network via the channel during the multicast presentation of the program, wherein the backfill video content includes additional video content associated with the multicast presentation of the program extending from the set-top box receipt time at which the set-top box began receiving video content associated with the multicast presentation of the program towards a start time of the multicast presentation of the program, wherein, at the same time as the change channel command, during the multicast presentation of the program, the unicast presentation is received from the buffer server, wherein the unicast comprises additional video content associated with the multicast of the program occurring prior to the start time of the backfill video content to a beginning time of the multicast of the program, wherein the backfill video content is stored by the digital video recorder;

monitoring for receipt of a subsequent channel change command at the set-top box device;

providing a subsequent channel change signal from the set-top box device to the digital video recorder based on detecting the receipt of the subsequent channel change command at the set-top box device, wherein the backfill content is deleted from the digital video recorder in response to one of the subsequent channel change signal, data indicating that the video content is no longer to be made available at the buffer server.

11. The system of claim 10, wherein the digital video recorder is adapted to receive a request from a set-top box device for at least a portion of the backfill video content and to provide the at least a portion of the backfill video content to the set-top box device in response to the request.

12. The system of claim 10, wherein the data indicating the channel is sent from the digital video recorder to the buffer server in response to the digital video recorder receiving a channel change command from the set-top box.

13. The system of claim 10, wherein the digital video recorder is adapted to send a backfill request to the buffer server, the backfill request including the data indicating a channel change command at the set-top box device and identifying the channel requested and the set-top box receipt time.

14. The system of claim 13, wherein the digital video recorder is an integral component of the set-top box and adapted to send the backfill request to the buffer server via a data network.

15. The system of claim 14, wherein the video distribution network is a cable network.

16. A system, comprising:
a set-top box device, wherein the set-top box device is associated with a digital video recorder;
a memory to store instructions; and
a processor coupled to the memory and the set-top box device, wherein responsive to executing the instructions, the processor performs operations comprising:
sending data from the set-top box device to a video head-end of a video distribution network, the data identifying a requested channel associated with a channel change command received, as a received channel change command, at the set-top box device;
receiving, responsive to the received channel change command, first video content associated with a multicast of a program provided from the video head-end via the requested channel at the set-top box device, the first video content beginning from a point in the multicast of the program associated with a set-top box receipt time corresponding to a time at which the set-top box device began receiving the multicast of the program;
buffering, in a video buffer of the set-top box, the first video content resulting in buffered video content;

retrieving, responsive to the received channel change command, backfill video content associated with the program from the digital video recorder connected with the set-top box device via a hardwire interface in response to a command to view previous video content associated with a point in the multicast of the program occurring prior to the set-top box receipt time received at the set-top box device, wherein the set-top box device is in proximity to the digital video recorder;

retrieving, responsive to the received channel change command, a unicast over a connection from a buffer server at the video head-end to a port of the digital video recorder, wherein the unicast comprises additional video content associated with the multicast of the program occurring prior to a starting point of the backfill video content to a beginning time of the multicast of the program;

retrieving during the multicast of the program, the buffered video content of the multicast of the program from the video buffer of the set-top box device in response to the command to view the previous video content associated with a point in the multicast of the program occurring subsequent to the set-top box receipt time;

monitoring for receipt of a subsequent channel change command at the set-top box device; and sending channel change information to the digital video recorder when the subsequent channel change command is received at the set-top box device, wherein the digital video recorder is configured to delete the backfill video content associated with the program in response to the channel change information, and wherein the backfill video content is deleted from the digital video recorder in response to the subsequent channel change command and in response to data indicating that the video content is no longer to be made available at the buffer server.

17. The system of claim 16, wherein the set-top box device is adapted to send the data to the video head-end via an access network selected from the group consisting essentially of a cable system, a satellite system, an internet protocol television system, or a combination thereof.

18. The system of claim 16, wherein the digital video recorder is an integral component of the set-top box, and wherein the set-top box device is adapted to receive the video content associated with the program via multicast, and wherein the digital video recorder receives the backfill video content from the buffer server via unicast only during the multicast of the program to the set-top box device.

19. A non-transitory machine-readable medium, comprising instructions, wherein responsive to executing the instructions, a processor performs operations comprising:
sending data from a set-top box device to a video head-end of a video distribution network, the data identifying a requested channel associated with a channel change command as a channel change request received at the set-top box device;
receiving video content associated with a multicast presentation of a program provided via the requested channel at the set-top box device, the video content beginning from a first point in the multicast of the program associated with a set-top box receipt time corresponding to a time at which the set-top box device began receiving the multicast of the program;
retrieving, responsive to sending the channel change request, a first portion of a previous multicast portion from backfill video content from a digital video recorder via a hardwire interface, wherein the digital video recorder is in proximity to the set-top box, wherein the backfill video content includes additional video content associated with the multicast presentation of the program extending from the set-top box receipt time towards a start time of the multicast presentation of the program;

determining a missing portion of the multicast presentation from an end of an available portion of the backfill video content at the digital video recorder and the start time of the multicast presentation of the program; and retrieving, responsive to sending the channel change request, a unicast from a buffer server at the video headend to the digital video recorder, wherein the unicast includes the missing portion of the video content associated with the multicast presentation of the program extending from the start time of the multicast presentation of the program towards a second point at which the digital video recorder does not include the additional video content extending from the set-top box receipt time towards a start time of the multicast presentation of the program, monitoring for receipt of a subsequent channel change command at the set-top box device; and sending channel change information to the digital video recorder when the subsequent channel change command is received at the set-top box device, wherein the digital video recorder is configured to delete the backfill video content associated with the program in response to the channel change information, and wherein the backfill video content is deleted from the digital video recorder in response to the subsequent channel change command and in response to data indicating that the video content is no longer to be made available at the buffer server.

20. The non-transitory machine-readable medium of claim 19, wherein the operations further comprise:

receiving a reverse command at the set-top box device, wherein the reverse command requests that a previously multicast portion of the multicast presentation of the program be displayed at a display device coupled to the set-top box device; and retrieving a first portion of the previously multicast portion from backfill video content from a digital video recorder via a hardwire interface in response to the reverse command, wherein the first portion comprises a portion of the backfill video content extending from a frame of the program indicated by the reverse command, to the set-top box receipt time.

21. The non-transitory machine-readable medium of claim 20, wherein the first portion comprises a portion of the backfill video content extending from a frame of the program indicated by a subsequent command, to the set-top box receipt time, wherein the subsequent command comprises one of a play command, a resume command, a stop reverse command, or a combination thereof, and wherein the digital video recorder is an integral component of the set-top box.

* * * * *